March 12, 1935.  T. R. ALLEY ET AL  1,993,986
VEHICLE SPRING
Filed Sept. 4, 1934
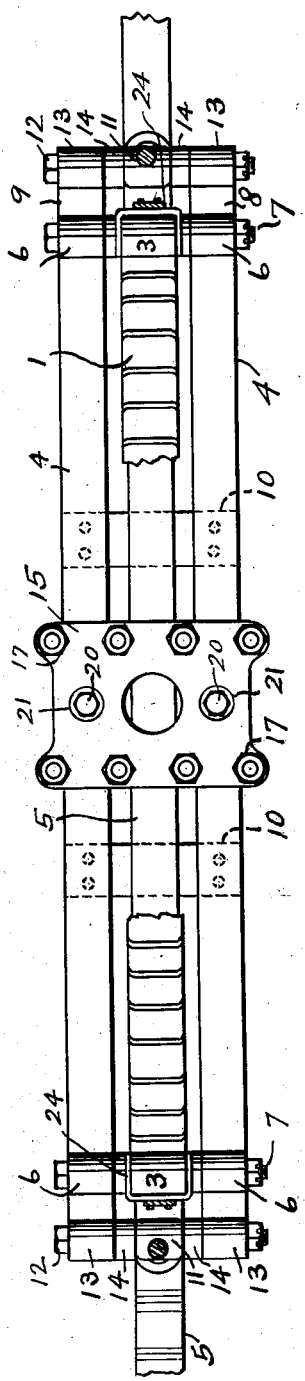
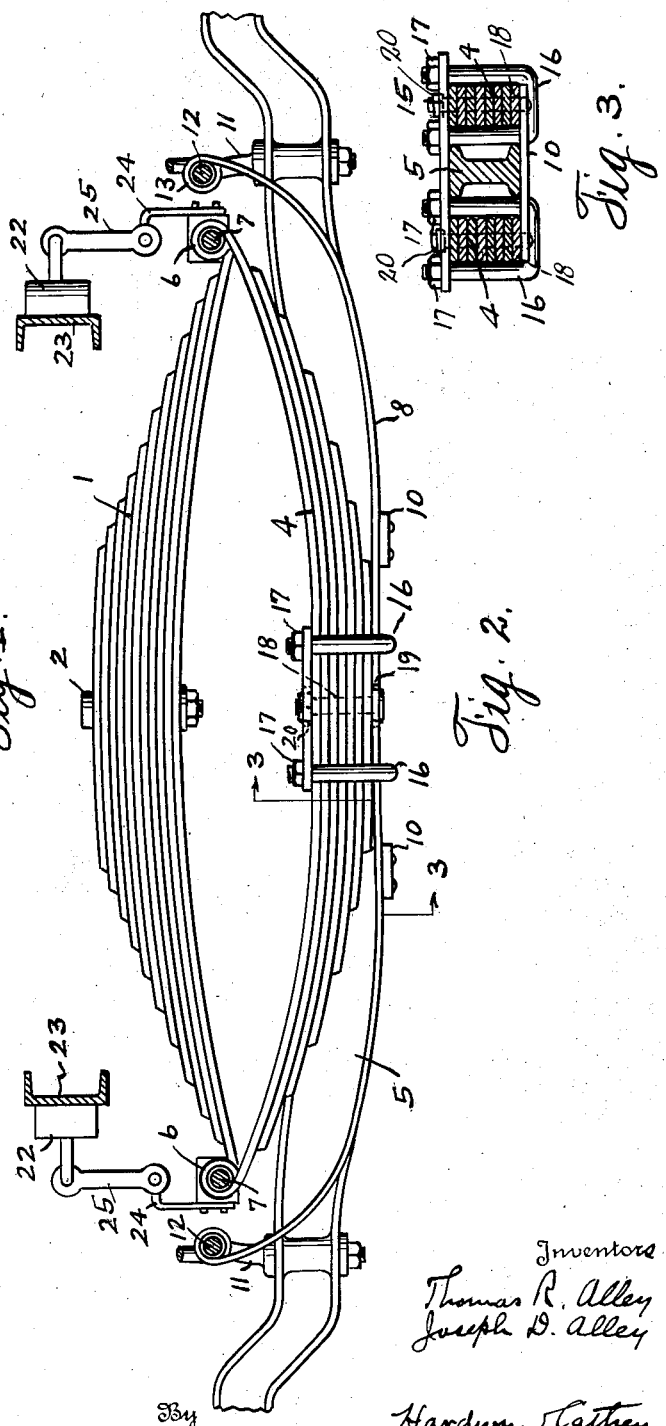
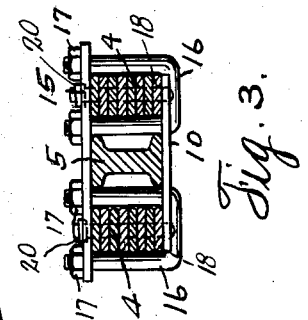

Patented Mar. 12, 1935

1,993,986

UNITED STATES PATENT OFFICE 1,993,986

VEHICLE SPRING

Thomas R. Alley and Joseph D. Alley, Alleyton, Tex., assignors of two hundred and twenty-five one-thousandths to Tulane Gordon, Houston, Tex., two hundred and twenty-five one-thousandths to W. D. Estlinbaum, and one hundred one-thousandths to E. C. Terrell, both of Eagle Lake, Tex.

Application September 4, 1934, Serial No. 742,620

4 Claims. (Cl. 267—38)

This invention relates to a vehicle spring, particularly designed for use on motor vehicles.

An object of the invention is to provide a full elliptic spring, which is applicable to that type of motor vehicle which is constructed to use the semi-elliptic type of spring suspension.

In the conventional type of vehicle employing transverse springs, semi-elliptical springs are almost universally used, and such type of spring is usually of such length that it is impossible to dissipate all road shocks by reason of the fact that should the spring be made flexible to absorb the road shocks, it would of necessity not be strong enough to maintain the required clearance between the body and running gear of the vehicle.

Another object of this invention is to provide a full elliptic spring, straddle-mounted with respect to the axle; the lower spring assemblies being mounted one on each side of the axle, and thus spaced apart and the single upper spring assembly being mounted between the two lower assemblies, said upper and lower assemblies being fastened together at each end by means of a single bolt which is fitted through the end eyes of the three spring assemblies.

Another important feature of the invention resides in the fact that the vehicle shock absorbers are attached to the ends of the full elliptical springs instead of to the axle, as is now commonly done. This is important for the reason that in dissipating the road shocks the shock absorbers, if attached to the spring ends, are required to do only one-half of the amount of work that would be required of them if they were attached directly to the axle for the reason that said point of attachment to the full elliptic springs has only one-half of the vertical movement as the point of attachment to the axle, thus decreasing the amount of work, and correspondingly lengthening the life of, the shock absorbers.

A still further object of the invention is to provide a transverse type of spring, having a two point suspension instead of the conventional transverse type, having a three point suspension, thus making for a more flexible front axle assembly, to the end that as road shocks are encountered by either wheel, the axle is free to move vertically up or down without disturbing the equilibrium of the vehicle body.

A still further object is to provide a double support for the two lower spring assemblies, which support forms also means for supporting and strengthening the axle, said supports being attached at each end to the conventional spring perches or to other suitable points of attachment.

With the above and other objects in view, this invention has particular relation to certain novel features of construction, operation and arrangement of parts, an example of which is given in this specification and illustrated in the accompanying drawing, wherein;

Figure 1 shows a plan view of the spring, shown partly broken away, and partly in section.

Figure 2 shows a front elevation, partly in section, and

Figure 3 shows a cross sectional view of the lower spring assemblies taken on the line 3—3 of Figure 2.

Referring now more particularly to the drawing, wherein like numerals of reference designate similar parts in each of the figures, the numeral 1 designates the upper spring assembly, composed of leaves, of conventional type, which are arched upwardly and secured together by the spring bolt 2 in any preferred manner. This assembly 1, has the end eyes 3, 3, formed by curving the free ends of the lower leaf upwardly so as to locate the eyes above said leaf.

There are two lower spring assemblies 4, 4, which are located on opposite sides of the vehicle axle 5. These lower spring assemblies are also formed of conventional spring leaves and the upper or longest leaves of these lower assemblies are provided with the end eyes 6, 6. These eyes are formed by curving the ends of said leaves upwardly so as to locate the eyes above the leaves, as more clearly shown in Figure 2. The eyes 3 and 6, 6, at each end are aligned and the bolts 7, 7, are inserted through said aligned eyes to secure said upper and lower spring assemblies together, said bolts having the usual heads on one end, and nuts on the other ends thereof.

The lower spring assemblies are seated on the front and rear spring supports 8, 9. These supports are formed of long strips of metal, such as spring-steel, and of such dimensions as to give them the required strength. They are fastened together by means of the cross-bars 10, 10, which may be riveted thereto underneath, and which are spaced apart and arranged on opposite sides of the center of the axle. These cross-bars rest against the under-side of the axle 5, in assembly, and in mounting the supports their free ends are forced upwardly into alignment with the spring perches 11, 11, and the bolts 12, 12, are then inserted through the eyes 13, at the ends of said supports, as well as through aligned bearings in said perches. The eyes 13 are maintained suitably spaced from the spring perches by the bushings 14, through which the bolts 12 also pass.

Across the top of the lower spring assemblies, and the axle there is a clamp plate 15, and each lower spring assembly is maintained assembled, as well as clamped to the corresponding support, by means of the U-bolts 16—16, one on each side of the center thereof, which are passed upwardly around the support and the corresponding spring assembly, and whose upper ends are fitted through suitable holes in said clamp plate, and receive the securing nuts 17, 17. These U-bolts draw the corresponding support at the central portion thereof, up closely against the corresponding spring assembly and when said support is assembled and mounted as above described, it will be placed under sufficient stress or tension to form an efficient reinforcement for the axle. This reinforcement is made necessary by reason of the fact that with the present construction the load is carried by the center of the axle, rather than by the spring perches near the ends thereof, hence the necessity of this addtional reinforcement. Each lower spring assembly has a center bolt 18, extending vertically through the leaves thereof. The lower end of each bolt is formed with a head 19, which is located in a suitable central opening in the corresponding spring support 8, or 9, and the upper end of each bolt 18 is threaded to receive a nut 20, located in a corresponding opening 21, in the clamp plate 15. The vehicle is equipped with conventional shock absorbers 22, 22, which are secured to the side members 23, 23, of the vehicle chassis. The spring ends are provided with suitable brackets 24, 24, which are anchored thereto, and which are connected to the shock absorbers proper, by means of the conventional links 25, in the usual way.

In use, the road shocks sustained by a wheel will be transmitted through the axle to the spring support at the center of the axle and thence, through said spring to the corresponding shock absorber, and the shock will thus be dissipated, so that the wheel will be free to move up and down without disturbing the equilibrium of the vehicle body.

Attention is called to the fact that the lower spring assemblies have their supports approximately at the level of the bottom of the front axle, and attention is further called to the fact that the eyes 3, 6, at the ends of the upper and lower spring assemblies are curved upwardly, or are located above the corresponding leaves on which they are formed. This construction makes it possible to employ elliptic transverse springs whose upper and lower assemblies have approximately the same curvature and without raising the chassis and body too high above the axle. This arrangement also provides ample space between the upper spring assembly and the axle, without giving said upper spring assembly too much curvature, so that the spring will have a sufficient range of movement to give the required resiliency without striking the axle.

The aligned upper and lower spring assemblies hereinabove described also give approximately double the spring capacity within the same transverse space as that of the semi-elliptic, transverse spring now in common use.

The drawing and description are illustrative merely, while the broad principle of the invention will be defined by the appended claims.

What we claim is:—

1. The combination with a vehicle having a wheel supported axle, of a full elliptical, transverse spring supported by the axle and supporting the vehicle chassis, and shock absorbers connected to the ends of the spring and to the vehicle above.

2. The combination with a vehicle having a wheel supported axle provided with spaced perches, of front and rear spring supports whose ends are anchored to said perches and whose mid-portions are clamped to the axle, a lower spring assembly mounted on each support, an upper assembly between the lower assemblies, said upper and lower assemblies being connected to form a full elliptical, transverse spring.

3. The combination with a vehicle having a wheel supported axle provided with spaced perches, of front and rear spring supports whose ends are anchored to said perches and whose mid-portions are clamped to the axle, a lower spring assembly mounted on each support, an upper spring assembly between the lower assemblies, said upper and lower assemblies being connected to form a full elliptical, transverse spring and shock absorbers connected to the ends of the spring and to the vehicle structure above.

4. The combination with a vehicle having an axle, spring supports on opposite sides of the axle, a lower spring assembly on each support, an upper spring assembly above the axle, said spring assemblies being connected and arranged to form a full elliptical transverse spring, shock absorbers connected to the chassis and to the spring ends.

THOMAS R. ALLEY.
JOSEPH D. ALLEY.